May 6, 1958     H. I. SELCH     2,833,547
DRILLING OR LIKE ROTARY CUTTING TOOL
Filed July 19, 1955
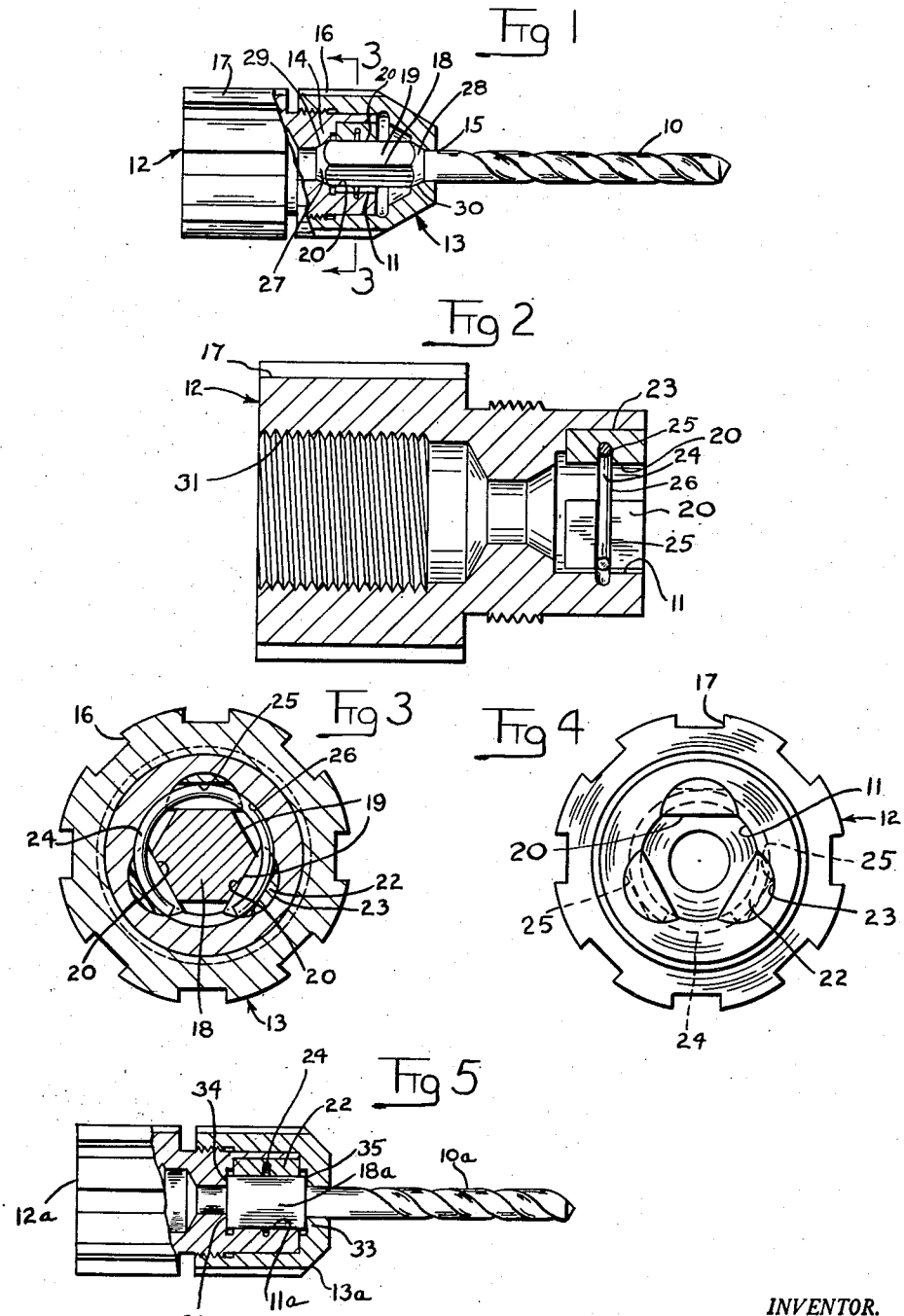
INVENTOR.
HOWARD I. SELCH
BY William Cleland
ATTORNEY

United States Patent Office 2,833,547
Patented May 6, 1958

2,833,547
DRILLING OR LIKE ROTARY CUTTING TOOL

Howard I. Selch, Canal Fulton, Ohio

Application July 19, 1955, Serial No. 523,012

10 Claims. (Cl. 279—91)

This invention relates to rotary cutting tools, and in particular relates to improvements in a chuck for use of a removable drill or other cutting tool therewith.

In the prior Howard I. Selch Patent No. 2,393,424, there is illustrated a tool of the character described. It was found, however, that while this prior structure was very effective and satisfactory in use, it required close manufacturing tolerances for proper complemental interfitting of the drill shank in the chuck therefor, in order to obviate relative movement or play between the drill and chuck during drilling operations. A tight fit between the drill and chuck necessitated use of a special wrench for application and removal of the drill-retaining cap threaded on the chuck. Moreover, broaching operations necessary for providing flat faces in a chuck socket were not only expensive, but were frequently inaccurate because of a tendency of broaching tools to "lead off" to one side, with resultant loss of concentricity.

One object of the present invention is to provide an improved drill and chuck assembly of the character described, wherein the chuck is provided with flat faced cam-like portions which are self-adjusting in use for drilling to a tight complemental fit with a flat sided drill shank received in the chuck, and whereby the initial interfitting of the drill and chuck may be relatively loose.

Another object of the invention is to provide a drill and chuck unit of the character described wherein a threaded drill-retaining cap may be manually applied and removed from the chuck, that is, without use of a wrench or other turning device.

Other objects of the invention will be manifest from the following brief description and the accompanying drawings.

Of the accompanying drawings:

Figure 1 is a front elevation, partly broken away and in section of a drill and chuck unit embodying the features of the invention.

Figure 2 is an enlarged vertical cross-section of the chuck alone, in the relative position thereof shown in Figure 1.

Figure 3 is a vertical cross-section on the same scale as Figure 2, taken substantially on the line 3—3 of Figure 1.

Figure 4 is an end view, on the same scale, of the chuck shown in Figure 2, as viewed from the right thereof.

Figure 5 is a view corresponding to Figure 1, on the same scale as Figure 1, illustrating a modified form of the invention.

Referring to Figures 1 to 4 of the drawings, there is illustrated a twist drill 10 removably and non-rotatably affixed in a socket 11 of a chuck 12, by means of a cap 13 threaded on an end 14 of the chuck. The drill projects freely through a hole 15 in the cap. To facilitate application and removal of the cap with respect to the chuck, the outer peripheral surfaces of the cap and of the other end portion of the chuck are each fluted, serrated, or otherwise provided with non-skid portions 16 and 17, respectively.

For preventing relative rotation of the drill 10 in the chuck, the drill may be provided with an enlarged shank 18 of hexagonal cross-section, providing a plurality of radially outwardly presented flat sides 19, 19, three of which, for example, complementally engage peripherally spaced flat surface portions 20, 20 on the inner face of the socket 11. These surface portions may be provided on elongated elements 22 of semi-circular or half-round cross-section, yieldingly retained in recesses 23 of half-round cross-section provided in the wall of the chuck socket 11, as by means of a split ring 24 of springy material engaging in peripherally extending recessed portions 25, 25 in the elements and aligned connecting recessed portions 26, 26 in said socket wall. Three such elements 22 are shown, whereby the flat sides 20 thereof are engaged by alternate flat sides of the shank, and whereby any relative rotation of the drill in the socket, to take up slack or looseness, will cause the elements to rotate or tilt correspondingly in the grooves 23 thereof until full flat engagement is achieved between the elements 22 and the flat sides 19 of the drill shank 18.

At opposite ends of the drill part 18 may be conical portions 27 and 28, in complemental engagement with conical seats 29 and 30 at the inner end of chuck socket 11 and oppositely inwardly presented on the cap 13, respectively, whereby tightening of the cap on the chuck is self-operating to align the drill with the longitudinal axis of the chuck.

In use of the improved chuck shown in Figures 1 to 4, the chuck body 12 is attached to a driven shank of a power drill, or other machine, as by means of threaded reception of the driven shaft (not shown) in a recess 31 of the chuck body. When the cap 13 is tightened, the conical portions 27 and 28 of the drill shank 18 are self-aligning in the conical seats 29 and 30, respectively, of the chuck 12 and said cap 13.

Also, in normal operation of the device for drilling, the tendency for the drill 10 to turn with respect to the chuck 12 is self-operating to tilt or pivot the elements 22 toward full flat engagement of the flat faces 20 thereof with corresponding flat faces 19 of the drill enlargement 18. Accordingly, this structure is such that substantial initial clearance may be provided between the flat inter-engaging faces, thereby facilitating insertion and removal of the drill from the chuck upon removal of cap 13 therefrom. It is this feature which makes it possible to apply or remove the cap 13 from chuck 12 with the fingers, that is, without necessarily using a wrench or other tool.

The self-adjusting structure of the device, particularly with reference to the pivoted elements 22, obviates use of expensive broaching operations which were formerly necessary to provide flat surface portions integral with the wall of the chuck.

Figure 5 illustrates a modified form of the invention wherein an enlargement 18a on a drill 10a is provided with flat end portions 32 and 33, flatly engaging flat seat portions 34 and 35 on the chuck 12a and cap 13a, respectively. In other words, the conical seating shown in Figures 1 to 4 is not provided. The structure of Figure 5, including the self-adjusting flat-sided elements 22, is otherwise substantially the same as before, and hence like parts are given like numerals, unless otherwise noted. It will be readily understood, however, that the drill enlargement 18a may be cylindrical and slidably received in a cylindrical bore or socket 11a of chuck 12a, in which case the device would function satisfactorily with only one pivoted element 22.

Other modifications of the invention may be resorted to without departing from the spirit thereof or the scope of the appended claims.

What is claimed is:

1. A holder of the character described for receiving a shank portion provided with at least one flat side, comprising a member having socket extending axially inwardly from an end thereof and adapted to receive said flat-sided shank portion axially therein, at least one element pivotally mounted in said member to be firmly backed and supported thereby and having a flat side presented inwardly of said socket for complemental engagement by a corresponding flat side of a said shank portion to prevent relative rotation of the shank portion in the member, said element thereby being pivotally self-adjusting to flatwise complemental engagement with said flat side of a said shank portion as by tendency of the same to rotate relatively of the member in use.

2. A holder of the character described for receiving a shank portion provided with at least one flat side, comprising a member having socket extending axially from an end thereof and adapted to receive said flat-sided shank portion axially therein, said member having at least one groove of semi-circular cross-section in the wall surface defined by said socket, and an element of semi-circular cross-section complementally received in each said semi-circular groove and having a flat side presented inwardly of said socket for complemental engagement by said flat side of a said shank portion to prevent relative rotation of the shank portion in the member, said element thereby being pivotally self-adjusting to flatwise complemental engagement with said flat side of the shank portion by tendency of the same to rotate relatively of the member in use.

3. A tool holder for a tool having a shank provided with at least one flat side, comprising a chuck having socket extending axially inwardly from an end thereof and adapted to receive said flat-sided shank axially therein, said chuck having at least one elongated groove of semi-circular cross-section in the wall surface defined by said socket, an element of semi-circular cross-section complementally received in each said semi-circular groove and having a flat side presented inwardly of said socket for complemental engagement by a flat side of the tool shank to prevent relative rotation of the tool in the chuck, said element thereby being pivotally self-adjusting to flatwise complemental engagement with said flat side by tendency of the tool to rotate relatively of the chuck in use, and an apertured cap threaded on said chuck being adapted to have said tool project outwardly through the aperture thereof and having an inner portion engageable with said tool shank to retain the tool in said recess.

4. A tool holder for a tool provided with an enlarged shank having opposite end abutment portions and a plurality of peripherally spaced flat faces extending axially of the tool, comprising a chuck having a socket extending inwardly from an end thereof and adapted to receive said shank axially therein, a plurality of correspondingly spaced elements pivotally mounted in said chuck to be firmly backed and supported thereby and having flat sides presented inwardly of said socket for complemental engagement by said corresponding flat sides of the tool shank to prevent relative rotation of the tool in the chuck, said element thereby being pivotally self-adjusting to flatwise complemental engagement with said flat side by tendency of the tool to rotate relatively of the chuck in use, and an apertured cap threaded on said chuck being adapted to have said tool project outwardly through the aperture thereof and having an inner portion engageable with said tool shank to retain the tool in said recess.

5. A tool holder for a tool provided with an enlarged shank having opposite end abutment portions and a plurality of peripherally spaced flat faces extending axially of the tool, comprising a chuck having a socket extending inwardly from an end thereof and adapted to receive said shank axially therein, said chuck having at least one elongated groove of semi-circular cross-section in the wall surface defined by said socket, and an element of semi-circular cross-section complementally received in each said semi-circular groove and having a flat side presented inwardly of said socket for complemental engagement by a flat side of the tool shank to prevent relative rotation of the tool in the chuck, said element thereby being pivotally self-adjusting to flatwise complemental engagement with said flat side by tendency of the tool to rotate relatively of the chuck in use, and an apertured cap threaded on said chuck being adapted to have said tool project outwardly through the aperture thereof and having an inner portion engageable with said tool shank to retain the tool in said recess.

6. A tool holder for a tool provided with an enlarged shank having opposite end abutment portions and a plurality of peripherally spaced flat faces extending axially of the tool, comprising a chuck having a socket extending inwardly from an end thereof and adapted to receive said shank axially therein, said chuck having at least one elongated groove of semi-circular cross-section in the wall surface defined by said socket, and an element of semi-circular cross-section complementally received in each said semi-circular groove and having a flat side presented inwardly of said socket for complemental engagement by a flat side of the tool shank to prevent relative rotation of the tool in the chuck, said element thereby being pivotally self-adjusting to flatwise complemental engagement with said flat side by tendency of the tool to rotate relatively of the chuck in use, and an apertured cap threaded on said chuck being adapted to have said tool project outwardly through the aperture thereof and having an inner portion engageable with said tool shank to retain the tool in said recess, spring means being provided for yieldingly retaining each said element in the corresponding said groove thereof.

7. A tool holder for a tool having a shank provided with at least one flat side and longitudinally oppositely disposed conical ends, comprising a chuck having a socket extending axially inwardly from an end thereof and adapted to receive said shank axially therein, said chuck having at least one axially extending groove of semi-circular cross-section in the wall surface within said socket, an element of semi-circular cross-section complementally received in each said groove and having a flat side presented inwardly of said socket for self-adjusting complemental engagement by a corresponding flat side of the tool shank to prevent relative rotation of the tool in the chuck, spring means resiliently retaining each said element in said groove thereof, and an apertured cap threaded on said chuck being adapted to have said tool project outwardly through the aperture thereof and having an inner portion engageable with said tool shank to retain the tool in said recess, said cap and chuck socket having therein conical seat portions complementally engageable by corresponding conical ends provided on said shank, whereby the tool is axially self-aligning upon tightening said cap on the chuck.

8. A tool holder for a tool having a shank portion provided with a plurality of peripherally spaced outwardly presented flat sides and the shank portion having longitudinally oppositely disposed conical ends, comprising a chuck having a socket extending axially inwardly from an end thereof and adapted to receive said shank portion axially therein, said chuck having a plurality of peripherally spaced axially extending grooves of semi-circular cross-section in the wall surface within said socket, an element of semi-circular cross-section complementally received in each said groove and having a flat side presented inwardly of said socket for self-adjusting complemental engagement by a corresponding flat side of the tool shank to prevent relative rotation of the tool in the chuck, spring means resiliently retaining each said element in said groove thereof, and an apertured cap threaded on said chuck being adapted to have said tool project outwardly through the aperture thereof and having an inner portion engageable with said tool shank to retain the tool in said recess, said cap and chuck socket having therein conical seat portions complementally engageable by corresponding conical ends provided on said shank, whereby the tool is axially self-aligning upon tightening said cap on the chuck.

9. In a device of the character described, a cutting tool having a shank portion provided with at least one flat side, a member having socket extending axially inwardly from an end thereof and adapted to receive said flat-sided shank portion axially therein, at least one element pivotally mounted in said member to be unyieldingly backed and supported thereby and having a flat side presented inwardly of said socket for complemental engagement by a corresponding flat side of said shank portion to prevent relative rotation of the shank portion in the member, said element thereby being pivotally self-adjusting to flatwise complemental engagement with said flat side of a said shank portion as by tendency of the same to rotate relatively of the member in use and means for releasably retaining said shank against axial movement in said socket.

10. In a device of the character described, a cutting tool having a shank portion provided with a plurality of peripherally spaced outwardly presented flat sides and the shank portion having oppositely disposed conical ends, a chuck having a socket extending axially inwardly from an end thereof and adapted to receive said shank portion axially therein, said chuck having a plurality of peripherally spaced axially extending grooves of semi-circular cross-section in the wall surface within said socket, an element of semi-circular cross-section complementally received in each said groove and having a flat side presented inwardly of said socket for self-adjusting complemental engagement by a corresponding flat side of the tool shank to prevent relative rotation of the tool in the chuck, spring means resiliently retaining each said element in said groove thereof, and an apertured cap threaded on said chuck being adapted to have said tool project outwardly through the aperture thereof and having an inner portion engageable with said tool shank to retain the tool in said recess, said cap and chuck socket having therein conical seat portions complementally engageable by corresponding conical ends provided on said shank, whereby the tool is axially self-aligning upon tightening said cap on the chuck.

References Cited in the file of this patent

UNITED STATES PATENTS 2,393,424     Selch _____ Jan. 22, 1946

FOREIGN PATENTS 737,349     France _____ Oct. 3, 1932
410,834     Italy _____ Jan. 12, 1945